(12) United States Patent
Yamada

(10) Patent No.: US 8,212,551 B2
(45) Date of Patent: Jul. 3, 2012

(54) BEARING WITH ABSOLUTE ANGLE SENSOR

(75) Inventor: Koji Yamada, Iwata (JP)

(73) Assignee: NTN Corporation, Osaka (JP)

( * ) Notice: Subject to any disclaimer, the term of this patent is extended or adjusted under 35 U.S.C. 154(b) by 538 days.

(21) Appl. No.: 11/659,219

(22) PCT Filed: Aug. 3, 2004

(86) PCT No.: PCT/JP2004/011083
§ 371 (c)(1),
(2), (4) Date: Oct. 21, 2008

(87) PCT Pub. No.: WO2006/013622
PCT Pub. Date: Feb. 9, 2006

(65) Prior Publication Data
US 2009/0102466 A1    Apr. 23, 2009

(51) Int. Cl.
*G01B 7/30* (2006.01)
(52) U.S. Cl. ............................... 324/207.25; 324/207.22
(58) Field of Classification Search ........................ None
See application file for complete search history.

(56) References Cited

U.S. PATENT DOCUMENTS

| | | | | |
|---|---|---|---|---|
| 3,636,767 A | * | 1/1972 | Duffy | 73/861.77 |
| 4,499,420 A | * | 2/1985 | Shiraki et al. | 324/174 |
| 4,732,494 A | * | 3/1988 | Guers et al. | 384/448 |
| 5,004,981 A | * | 4/1991 | Hashimoto et al. | 324/207.22 |
| 5,130,650 A | | 7/1992 | Lemarquand | |
| 5,438,260 A | * | 8/1995 | Rigaux et al. | 324/166 |
| 5,786,781 A | * | 7/1998 | Taniguchi et al. | 341/111 |
| 5,893,648 A | * | 4/1999 | Smith | 384/448 |
| 6,188,341 B1 | * | 2/2001 | Taniguchi et al. | 341/116 |
| 6,201,389 B1 | * | 3/2001 | Apel et al. | 324/207.2 |
| 6,696,140 B2 | | 2/2004 | Suzuki | |
| 6,861,121 B2 | | 3/2005 | Matsunaga | |
| 2002/0142133 A1 | | 10/2002 | Matsunaga | |
| 2002/0150722 A1 | | 10/2002 | Suzuki | |
| 2003/0123151 A1 | | 7/2003 | Matsunaga | |
| 2004/0070041 A1 | | 4/2004 | Obayashi et al. | |

FOREIGN PATENT DOCUMENTS

| | | | |
|---|---|---|---|
| DE | 44 43 898 A1 | | 6/1996 |
| JP | 05231879 A | * | 9/1993 |
| JP | 07318369 A | * | 12/1995 |

(Continued)

OTHER PUBLICATIONS

European Search Report issued Dec. 12, 2008 in corresponding European Patent Application 04748215.3.
International Search Report dated Nov. 22, 2005.
Written Opinion of the International Searching Authority dated Nov. 22, 2005.

(Continued)

*Primary Examiner* — Paresh Patel

(57) ABSTRACT

A rotation sensor equipped bearing capable of detecting a highly precise absolute angle with no correction work required after incorporation into a bearing installed equipment. An absolute angle sensor equipped bearing assembly includes a sensor equipped bearing and a correction data storing device. The sensor equipped bearing has a rotation detector capable of providing, as a detection output indicative of the rotation angle of a rotating raceway ring relative to a stationary raceway ring, two analog outputs that are offset 90° in phase relative to each other in terms of electrical degree. The correction data storing device stores a correction data for correcting an error when the absolute angle of the rotation angle of the rotating raceway ring is calculated from the two analog outputs and which is paired with the sensor equipped bearing.

5 Claims, 10 Drawing Sheets

FOREIGN PATENT DOCUMENTS

| | | | |
|---|---|---|---|
| JP | 2000-338310 | A | 12/2000 |
| JP | 2001-349898 | | 12/2001 |
| JP | 2002-196117 | A | 7/2002 |
| JP | 2002-265866 | A | 9/2002 |
| JP | 2002-317152 | A | 10/2002 |
| JP | 2003-057415 | A | 2/2003 |
| JP | 2003-075603 | A | 3/2003 |
| JP | 2003-121620 | A | 4/2003 |
| JP | 2003-161816 | A | 6/2003 |
| JP | 2005127378 | A * | 5/2005 |
| JP | 2005127796 | A * | 5/2005 |
| JP | 2005283364 | A * | 10/2005 |
| WO | 2004/049018 | A1 | 6/2004 |

OTHER PUBLICATIONS

Office Action mailed on May 9, 2008 and issued in corresponding Chinese Patent Application No. 2004800437412.

International Preliminary Report on Patentability issued in corresponding International Application No. PCT/JP2004/011083, mailed on May 3, 2007.

International Search Report mailed Nov. 2, 2004 (International Application No. PCT/JP2004/011083, Filed Aug. 3, 2004).

European Search Report dated Jul. 4, 2011 in corresponding European Patent Application 04 748 215.3, (five pages).

* cited by examiner

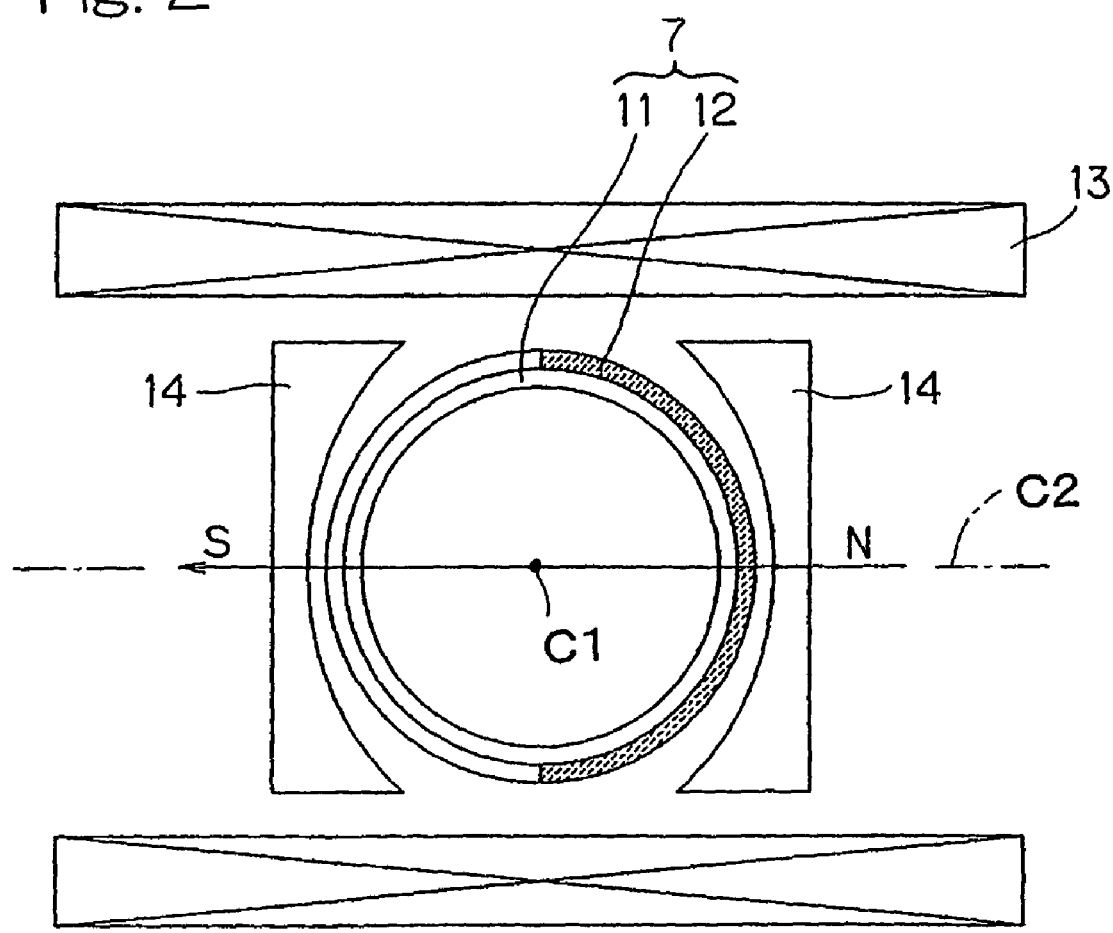

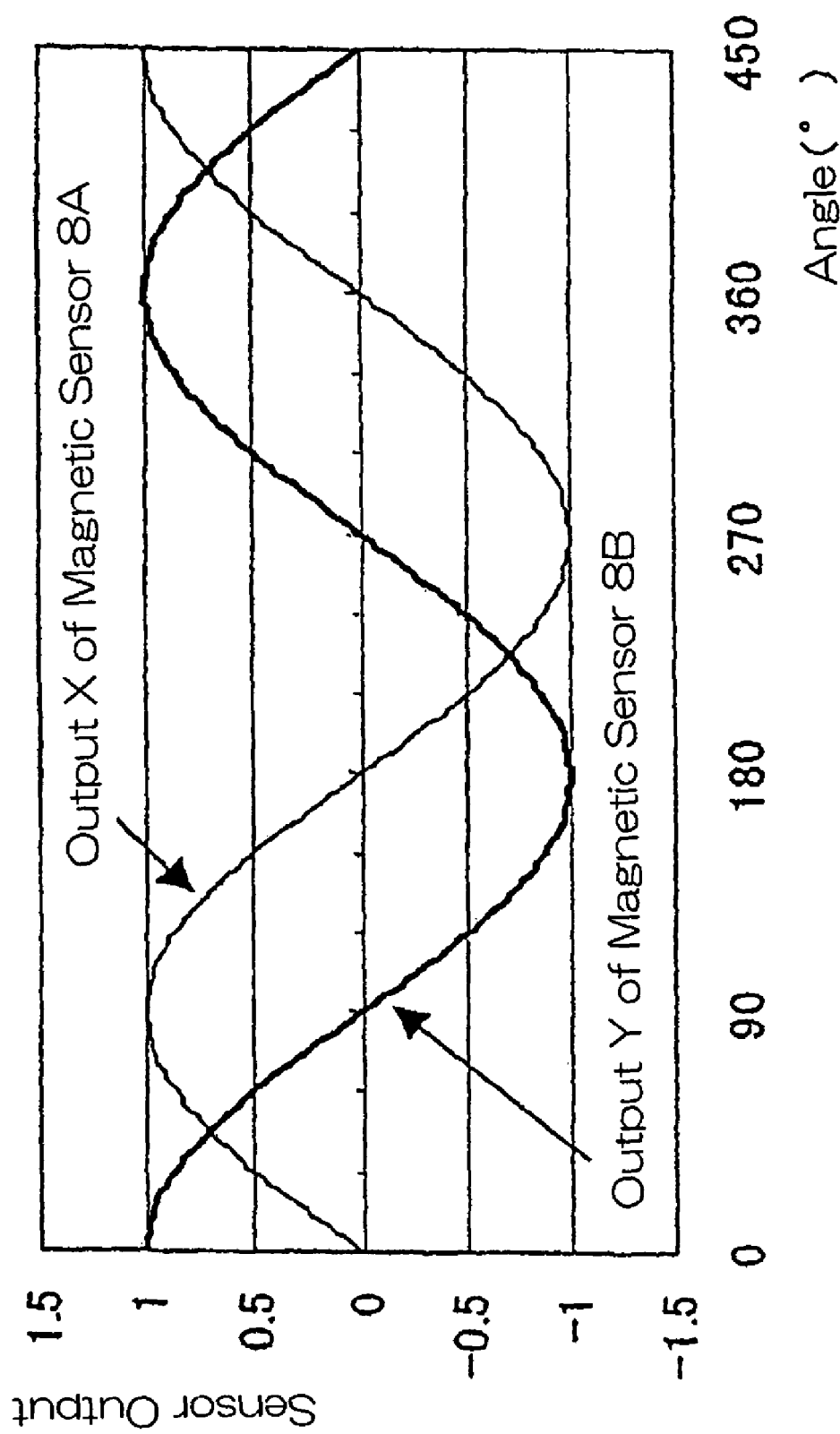

BEARING WITH ABSOLUTE ANGLE SENSOR

CROSS REFERENCE TO RELATED APPLICATIONS

This application claims the benefit under 35 U.S.C. Section 371, of PCT International Application Number PCT/JP2004/011083, filed Aug. 3, 2004, the contents of which are incorporated herein by reference.

BACKGROUND OF THE INVENTION

1. Field of the Invention

The present invention relates to a bearing assembly with an absolute angle sensor built therein, which is used for detecting a rotational angle in various machines and equipments, for example, for detecting the angle necessary to control the position of a compact motor or for detecting the absolute angle in robotic articulated joints.

2. Description of the Prior Art

For the detection of the rotational angle of this type of apparatus, an encoder is largely employed. In the field of application, where more reduction in size and in cost is required, a sensor-equipped bearing having a magnetic sensor built in a bearing unit is employed. The magnetic-sensor-equipped bearing is insufficient in respect of precision as compared with an external optical encoder and, after the bearing has been incorporated in an apparatus that requires the use thereof particularly for the detection of the absolute angle, a correction work in any way such as, for example, a work for preparing a correction data while it is connected with a highly precise encoder is required essentially.

As a literary document on the sensor equipped bearing, an incremental type encoder equipped bearing, in which a multipole-magnetized magnetic generating member is provided in a rotating member, and a magnetic sensor is provided in a fixed member. (See, for example, the JP Laid-open Patent Publication No. 2001-349898, published Dec. 21, 2001.) As compared with a standard mechanism utilizing an encoder separate from a bearing, this is extremely compact in structure, but it is impossible to detect the absolute angle.

On the other hand, as a sensor capable of detecting the absolute angle, a resolver is largely known. However, even with the resolver, in order to achieve a highly precise detection of the absolute angle, some sort of correction work is necessary after the bearing has been incorporated in the equipment. By way of example, in the JP Patent No. 2607048 (JP Laid-open Patent Publication No. 7-318369, published Dec. 8, 1995), it is suggested that a highly precise incremental encoder is coupled with a direct drive motor incorporating the resolver and a correction data is prepared with the aid of a central processing unit.

In the angle detecting device of a type separate from the bearing such as the resolver, the correction data changes because of an error in shaft alignment occurring at the time of incorporation and, therefore, it is difficult to achieve a highly precise angle detection only with the resolver. Because of this, it is necessary to provide an attachment for fitting a means for performing a correction of the detected angle, for example, a high precision encoder for correction purpose to a system incorporating the resolver, for example, a direct drive motor. Also, since it is necessary to perform a correction work each time the motor is incorporated in the resolver, the user is required to undertake complicated works.

Also, the absolute angle detection with the use of the resolver is generally carried out using an RD converter. Since in principle the correction data cannot be incorporated in the RD converter itself, the example suggested in the above mentioned JP Patent No. 2607048 makes use of a correctional circuit including a central processing unit as hereinabove described and, for this reason, the angle detecting device becomes complicated and costly.

On the other hand, in the magnetic sensor equipped bearing, it is known that the absolute angle can be detected by detecting with a magnetic sensor a signal that changes over one complete rotation, for example, one cycle of sinusoidal wave per one complete rotation which signal is magnetized to a magnetic generating member. Also, since the sensor equipped bearing is of a structure, in which a sensor unit and a bearing unit are integrated together, no work such as shaft alignment is required. However, it is difficult to cause the magnetic generating member to be magnetized in a desired pattern and a highly precise angle detection has not yet been realized with the sensor itself.

SUMMARY OF THE INVENTION

An object of the present invention is to provide a rotation sensor equipped bearing, in which with no correction work after incorporation into a bearing installed equipment, the absolute angle can be highly precisely detected.

The absolute angle sensor equipped bearing assembly according to the present invention includes a sensor equipped bearing having a rotation detector capable of providing, as a detection output indicative of the rotation angle of a rotating raceway ring relative to a stationary raceway ring, two analog outputs that are offset 90° in phase relative to each other in terms of electrical degree, and a correction data storing device, which stores a correction data for correcting an error when the absolute angle of the rotation angle of the rotating raceway ring is calculated based on the two analog outputs is recorded, and which is used pared with the sensor equipped bearing.

According to this construction, since the correction data storing device, which is used paired with the sensor equipped bearing, is provided in the individual sensor equipped bearing, the correction data used when the absolute angle is to be calculated can be measured during the manufacture of such bearing and be recorded in the correction data storing device with respect to the individual sensor equipped bearing. Because of this, without any correction work after incorporation of the bearing into the bearing installed equipment, the absolute angle can be detected highly precisely. Hence, the inexpensive rotation sensor equipped bearing capable of detecting the absolute angle highly precisely can be realized.

The rotation detector referred to above may include a to-be-detected element fitted to the rotation side raceway ring and having a magnetic characteristic cyclically varying in a circumferential direction, and two magnetic sensors fitted to the stationary raceway ring in face-to-face relation with the to-be-detected element and capable of providing respective analog outputs offset 90° in phase relative to each other in terms of electrical degree.

If the to-be-detected element having the magnetic characteristic varying cyclically in the circumferential direction is employed as described above, the absolute angle can be simply and precisely outputted by using a correction data of the correction data storing device is used. Also, since the analog outputs having a phase difference can be obtained from the two magnetic sensors, it is possible to make it hardly affected by an external magnetic field when a proper signal processing is performed. In such case, because of the 90° phase difference, a quadrant determination is possible, allowing a further highly precise detection of the absolute angle to be achieved.

In the case of any one of the foregoing constructions of the present invention, the correction data storing device referred to above may include a correction table, storing the correction data referred to above, and an absolute angle calculating section, which utilizes the correction table to calculate the absolute angle based on the two analog outputs, and the correction data referred to above is based on an angle correction data measured after the manufacture of the sensor equipped bearing.

If the angle correction data, measured subsequent to the manufacture of the sensor equipped bearing, is recorded in the correction data, a further precise detection of the absolute angle is possible.

The correction data recorded in the correction data storing device may be integrated with an angle value, which provides a result of calculation of an inverse arc tangent in an inverse arc tangent calculation table.

In the case of this construction, the absolute angle is obtained by comparing a detection value of the rotation detector with the inverse arc tangent calculation table. While calculation of the inverse arc tangent with a digital system tends to be complicated, it can easily be determined by referring to the table of results of the inverse arc calculation prepared beforehand based on a result of division. At this time, since the angle value, which becomes a result of calculation of the inverse arc tangent in the calculation table is integrated with the correction data, that is, since the angle value, which becomes a result of calculation of the inverse arc tangent is rendered to be a corrected data, the angle value obtained using the above described calculation table represents a corrected value. Because of this, no additional correction calculation need be performed after the calculation of the inverse arc tangent, and the absolute angle can be highly precisely detected by means of a simple processing.

In the case of any one of the foregoing constructions of the present invention, the correction data storing device referred to above may be a one-chip type microcomputer or a programmable logic circuit. Alternatively, it may be a circuit board having the one-chip microcomputer or the programmable logic circuit mounted thereon.

Where the correction data storing device is a component having a calculating function as described above, a part of such component can be used for recording of the correction data and the calculating function of this component can be utilized to cause the absolute angle to be calculated. Because of this, no extra component that serves as a calculating means need be employed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is an explanatory diagram showing a method of magnetizing the to-be-detected element in the bearing;

FIG. 3 is a diagram showing waveforms of respective outputs from two magnetic sensors in the bearing;

DETAILED DESCRIPTION OF THE EMBODIMENTS

Figure 4:
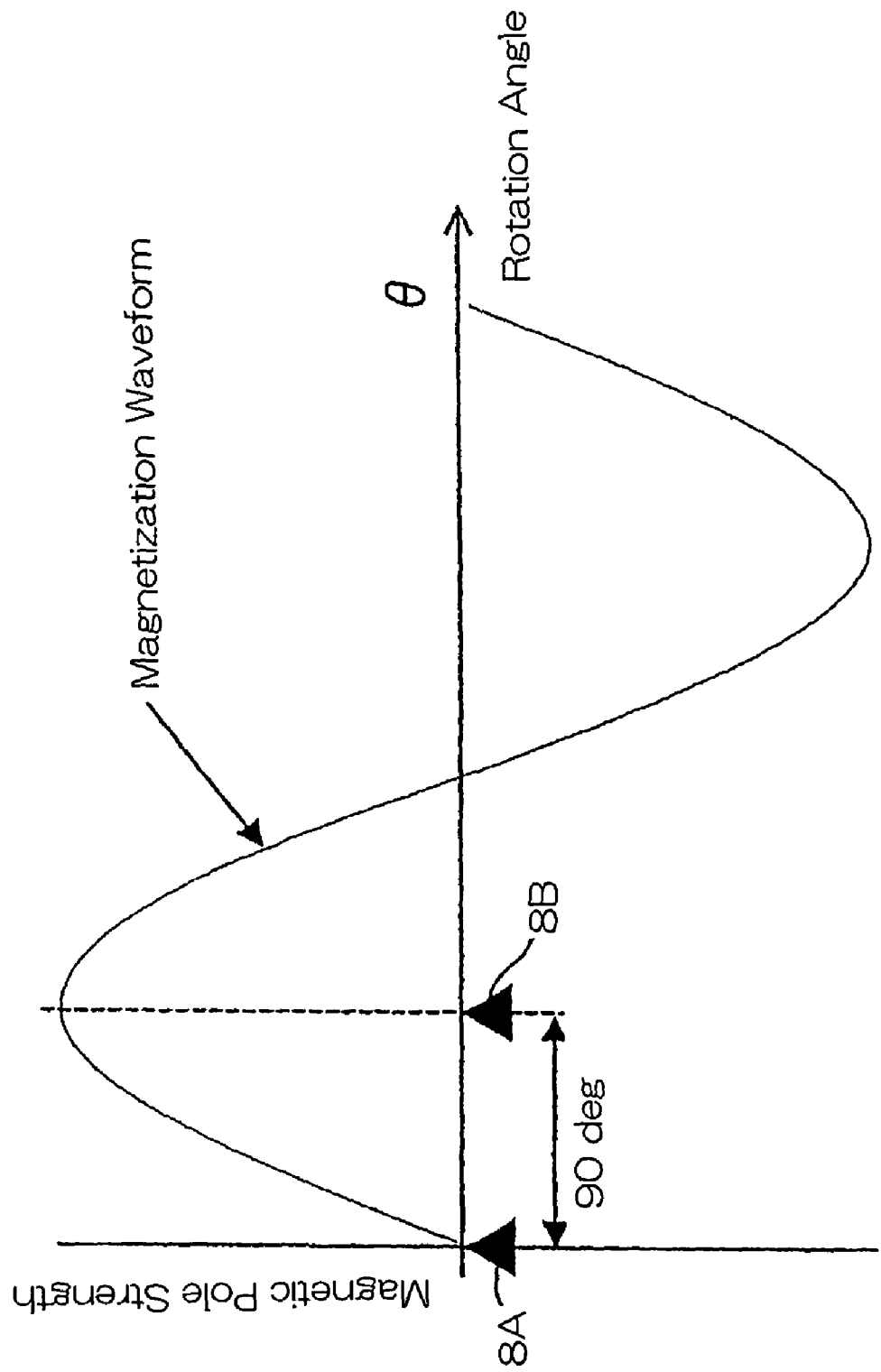
FIG. 4 is an explanatory diagram showing the relation between the two magnetic sensors and the magnetized waveforms of the to-be-detected element in the bearing.
Figure 5:
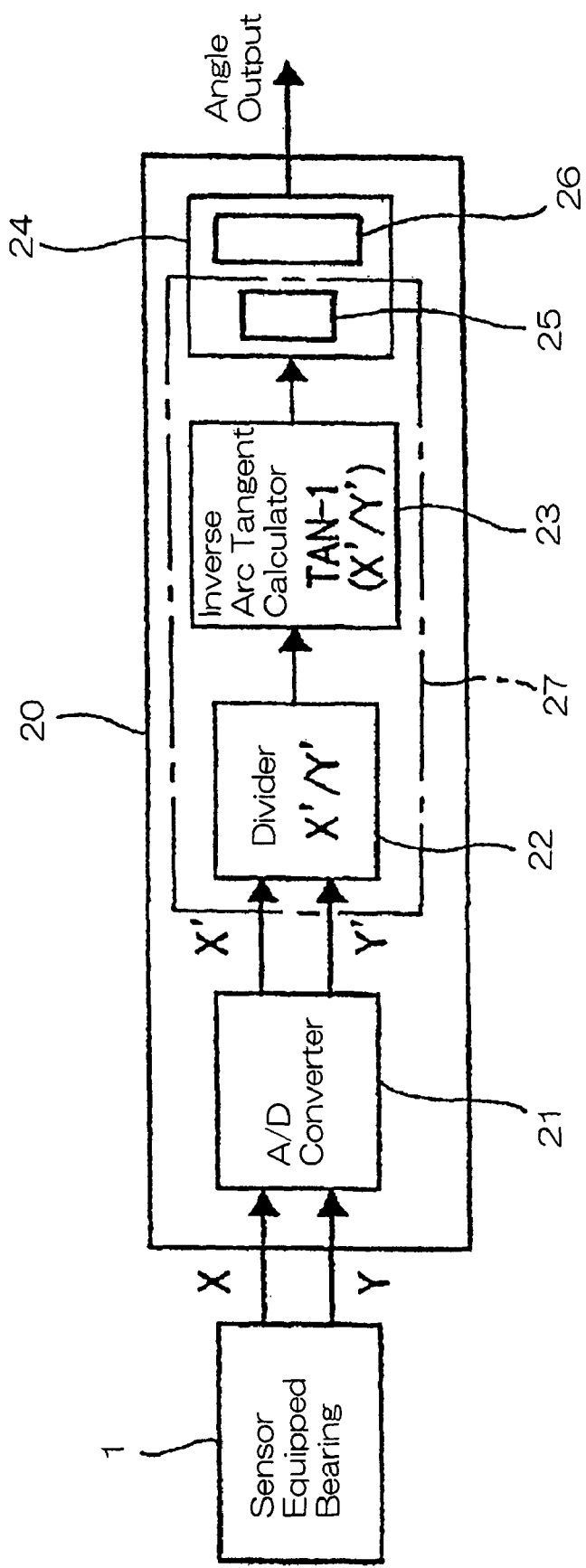
FIG. 5 is a block diagram showing a schematic construction of the absolute angle sensor equipped bearing assembly according to this embodiment.

A first preferred embodiment of the present invention will be described with particular reference to FIGS. 1 to 7. As shown in FIG. 5, an absolute angle sensor equipped bearing assembly according to this embodiment includes a sensor equipped bearing 1 and a correction data storing device 20 that is used paired with this sensor equipped bearing 1. As best shown in FIG. 1, this sensor equipped bearing 1 includes a bearing unit 1A having a rotating raceway ring 2 and a stationary raceway ring 3, which are rotatable relative to each other through rolling elements 4, and a rotation detector 6. The bearing unit 1A is in the form of a deep-groove ball bearing having an inner race represented by the rotating raceway ring 2 and an outer race represented by the stationary raceway ring 3. The rotating raceway ring 2 has an outer diametric surface formed with a raceway 2a and the stationary raceway ring 3 has an inner diametric surface formed with a raceway 3a, and the rolling elements 4 are retained by a retainer 5. The rotation detector 6 is of a type capable of outputting two analog outputs, which are offset 90° relative to each other in terms of electric degree, as a detection output indicative of the rotation angle of the rotating raceway ring 2 relative to the stationary raceway ring 3. The rotation detector 6 includes a to-be-detected element 7 secured to one end portion of the rotatable raceway ring 2 and two magnetic sensors 8A and 8B fitted to one end portion of the stationary raceway ring 3 in face-to-face relation with the to-be-detected element 7. An annular space delimited between the rotating raceway ring 2 and the stationary raceway ring 3 has one end, which is on one side remote from the rotation detector 6, sealed by a sealing member 10.

The to-be-detected element 7 of the rotation detector 6 is of a radial type and is an annular component having a magnetic characteristic relative to the magnetic sensors 8A and 8B, which varies cyclically in a circumferential direction. This magnetic characteristic undergoes a cycle of change per one complete rotation of the rotating raceway ring 2. More specifically, it includes an annular backing metal 11 and a magnetic generating member 12 provided on an outer peripheral side thereof and magnetized with magnetic poles N and S that alternate in a circumferential direction. This to-be-detected element is fixed to the rotating raceway ring 2 through the backing metal 11. The magnetic generating member 12 is rendered to be a rubber magnet and bonded by vulcanization to the backing metal 11. The magnetic generating member 12 may be formed of either a plastic magnet or a sintered magnet, in which case the backing metal 11 may not be always employed.

FIG. 2 illustrates an example of a process performed to render the magnetic generating member 12 of the to-be-detected element 7 to have the above described magnetic characteristic. In this process, an annular component, which eventually forms the annular to-be-detected element 7, is arranged inside a hollow coil 13 wound in a cylindrical form, with its longitudinal axis C1 lying perpendicular to the longitudinal axis C2 of the hollow coil 13. While a magnetizing yoke 14 for correction of a magnetizing strength distribution is arranged at a location adjacent to an outer peripheral portion of the component, which eventually forms the to-be-detected element 7, a magnetizing current is supplied to the hollow coil 13. In this way, a sinusoidal distribution of magnetization, in which one cycle corresponds to one complete rotation as shown in FIG. 4, can be obtained in the magnetic generating member 12 of the to-be-detected element 7.

Figure 1A:
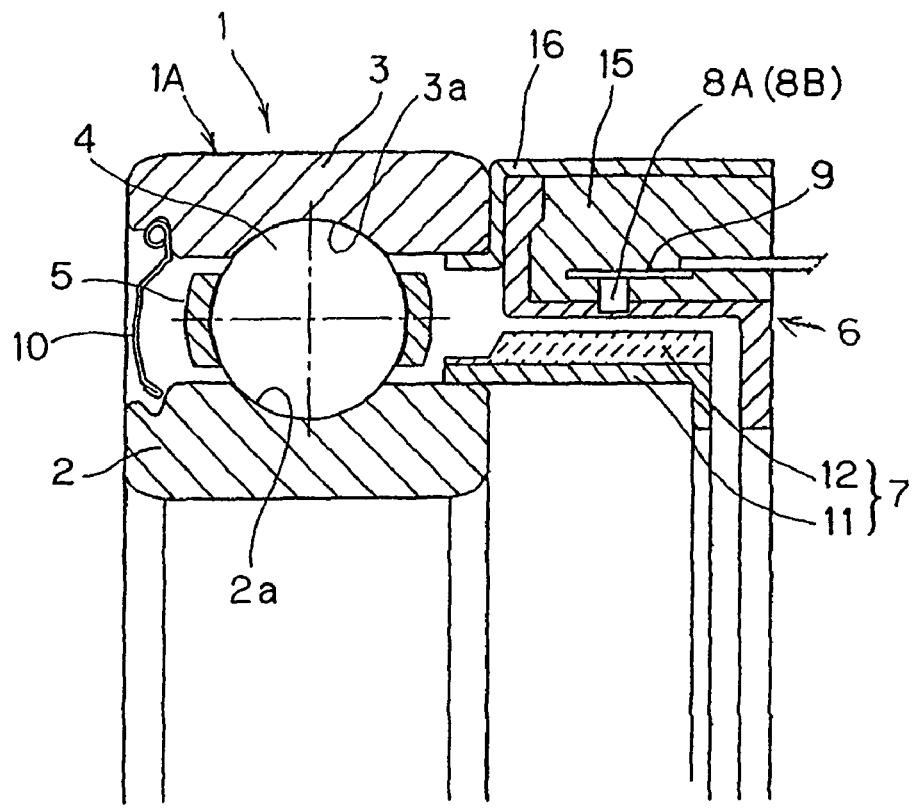
FIG. 1A is a sectional view showing a sensor equipped bearing used in an absolute angle sensor equipped bearing assembly according to a first preferred embodiment of the present invention.
Figure 1B:
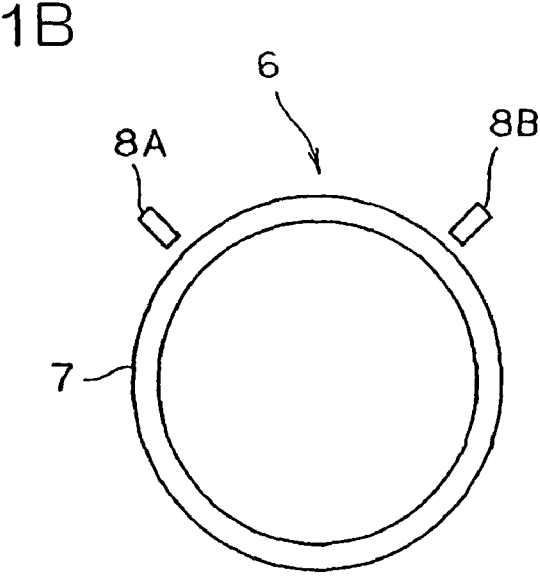
FIG. 1B is a schematic diagram showing the relation between a to-be-detected element and a magnetic sensor in the bearing.

Referring to FIG. 1A, the two magnetic sensors 8A and 8B forming respective parts of a magnetic detecting element of the rotation detector 6 are arranged spaced a predetermined distance (in 90° phase difference in terms of mechanical angle) in a circumferential direction as shown in FIG. 1B. Each of those magnetic sensors 8A and 8B is in the form of an analog sensor. Those magnetic sensors 8A and 8B are mounted on a magnetic detecting circuit board 9 as shown in FIG. 1A, and encapsulated with a resin molding after they have been inserted into a resin casing 15 together with the magnetic detecting circuit board 9. By fixing this resin casing 15 to the stationary raceway ring 3 through a metallic casing 16, the magnetic sensors 8A and 8B and the magnetic detecting circuit board 9 are fitted to the stationary raceway ring 3. The magnetic detecting circuit board 9 has a circuit mounted thereon for supplying an electric power to the magnetic sensors 8A and 8B, for processing respective output signals from the magnetic sensors 8A and 8B and for outputting the processed output signals to the outside.

FIG. 3 illustrates waveforms of respective detection signals of the magnetic sensors 8A and 8B during rotation of the rotating raceway ring 2. As shown therein, since the analog outputs X and Y which are offset 90° in phase relative to each other in terms of electric degree can be obtained from the two magnetic sensors 8A and 8B, quadrant determination is possible and the absolute angle can be ascertained from those outputs X and Y. FIG. 4 illustrates the relation between a magnetized waveform of the to-be-detected element 7 and the respective positions at which the magnetic sensors 8A and 8B are disposed. As indicated by FIG. 4, the analog output X from the first magnetic sensor 8A represents a sinusoidal wave whereas the analog output Y from the second magnetic sensor 8B represents a cosine wave. That is to say, the following equations establish between the analog outputs X and Y and the absolute angle θ:

$$X = \mathrm{Sin}(\theta) \quad (1)$$

$$Y = \mathrm{Cos}(\theta) \quad (2)$$

Accordingly, the absolute angle θ can be expressed by the following equation:

$$\theta = \mathrm{Tan}^{-1}(X/Y) \quad (3)$$

It is, however, practically difficult to render the magnetizing waveform of the to-be-detected element 7 to such an ideal sinusoidal wave as shown in FIG. 4 and, therefore, an error occurs even when the absolute angle θ is calculated according to the above described equations (1) to (3) using the respective analog outputs X and Y from the magnetic sensors 8A and 8B in the form as outputted. In view of this, in order to detect a highly precise absolute angle θ, the correction data storing device 20 (FIG. 5) is added to this absolute angle sensor equipped bearing assembly. This correction data storing device 20 may be disposed either on the sensor equipped bearing 1 or at a location distant from the sensor equipped bearing 1.

FIG. 5 illustrates a schematic structure of the absolute angle sensor equipped bearing assembly according to this embodiment in a block diagram. The correction data storing device 20 stores a correction data necessary to perform an error correction when the absolute angle of the rotational angle of the rotating raceway ring 2 is calculated from the two analog outputs X and Y of the rotation detector 6. This correction data storing device 20 includes a correction table 26 recorded with the correction data necessary to perform the error correction when the absolute angle of the rotating raceway ring 3 from the respective analog outputs X and Y of the magnetic sensors 8A and 8B, and an absolute angle calculating section 27 for calculating the absolute angle from the respective analog outputs X and Y with the use of the correction data stored in this correction table 26. This correction data storing device 20 is composed in digital form so that the absolute angle can be calculated, and includes, in addition to the correction table 26 and the absolute angle calculating section 27, an analog-to-digital (A/D) converter 21 for A/D converting the analog outputs X and Y from the magnetic sensors 8A and 8B. The absolute angle calculating section 27 is made up of a divider 22 for dividing utilizing the respective outputs X' and Y' of the magnetic sensors 8A and 8B, which have been converted by the A/D converter 21 into digital signals, an inverse arc tangent calculator 23 for performing an inverse arc tangent calculation corresponding to the above described equation (3) from an calculated output (X'/Y') of the divider 22, and a correction processing unit 25 for outputting a corrected absolute angle θ' by referring the absolute angle θ, which is a calculated output of the inverse arc tangent calculator 23, to the correction data stored in the correction table 26. The correction processing unit 25 and the correction table 26 altogether form a corrector 24. The inverse arc tangent calculator 23 may be of a type capable of determining the absolute angle θ with the use of, for example, a calculation table (LUT: Look-up Table; not shown), in which the calculated output (X'/Y') of the above described divider is stored in comparison with the absolute angle value of the inverse arc tangent, when the inverse arc tangent calculation corresponding to the above described equation (3) is performed from the calculated output (X'/Y') of the divider 22. Although the inverse arc tangent calculation in the digital system tends to be complicated, it can be easily determined by referring to the table of result of inverse arc tangent calculation that has been prepared from the result of division.

Figure 6:
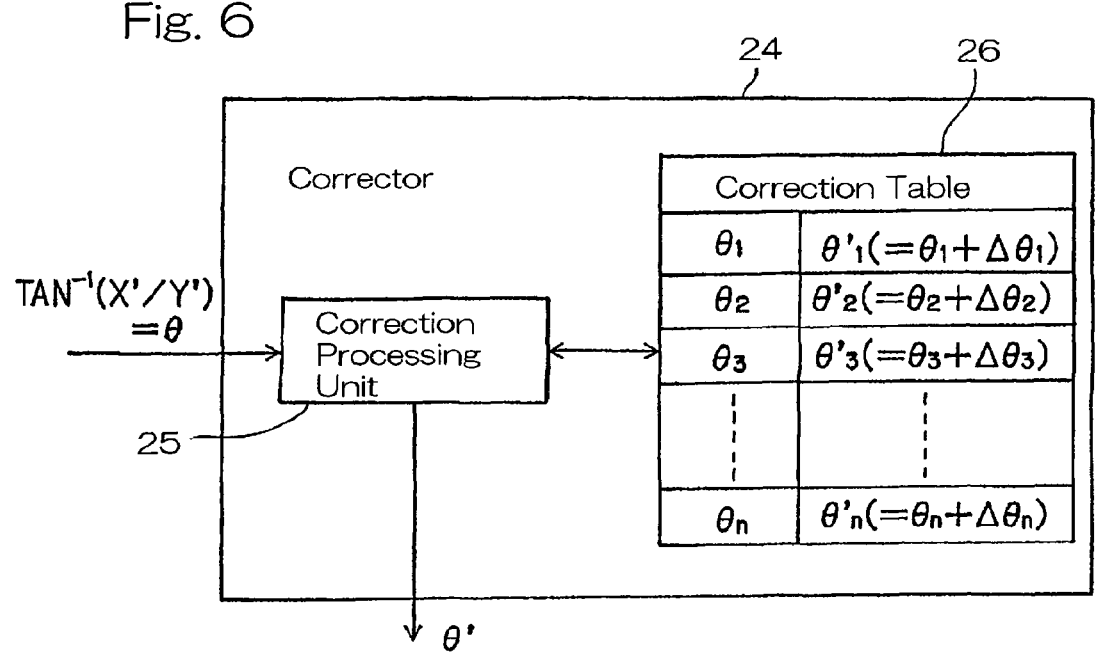
FIG. 6 is a block diagram showing a structure of a corrector employed in the bearing assembly.
Figure 7:
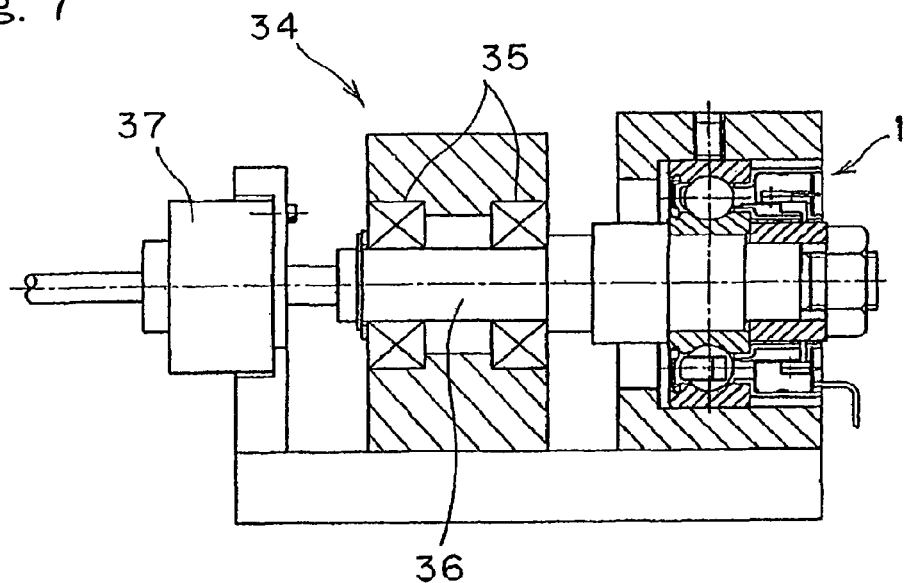
FIG. 7 is a sectional view of a correction device used in measurement of a correction data of a correction data storing device employed in the bearing assembly.

FIG. 6 illustrates a block diagram showing a structure of the above described corrector 24. The correction table 26 stores the absolute angle θ (=Tan$^{-1}$(X'/Y')) calculated based on the two analog outputs X and Y, and the absolute angle θ', obtained by correcting the calculated absolute angle θ, in coordination with individually calculated absolute angles $θ_1$, $θ_2$, . . . , and $θ_n$. In other words, the values of the calculated absolute angles θ each corrected by a correction value Δθ are coordinated as the absolute angle θ'.

The correction data in the correction table 26 is based on a angle correction data measured after the manufacture of the sensor equipped bearing 1. The measurement of the angle correction data in this case is carried out with, for example, a correction device 34 shown in FIG. 7. In this correction device 34, while one end portion of a rotary shaft 36 supported rotatably by a bearing 35 and adapted to be rotatably driven is supported by the sensor equipped bearing 1 of the absolute angle sensor equipped bearing assembly and a high precision encoder 37 is mounted on the opposite end portion of the rotary shaft 36. A detection data of the rotational angle detected by the high precision encoder 37 and a data on the rotational angle calculated based on the respective outputs X and Y of the two magnetic sensors 8A and 8B in the sensor equipped bearing 1 are measured and coordinated with each other. Since the sensor equipped bearing 1 is such that the relative positional relation between the bearing unit 1A and the rotation detector 6 does not change even after the sensor equipped bearing 1 has been incorporated in an equipment, once the correction data has been prepared after the manufacture as hereinabove described, no additional correction work need be effected to the absolute angle to be detected, after the absolute angle sensor equipped bearing assembly has been shipped and the sensor equipped bearing 1 thereof has been incorporated in a user's system.

As described above, in the absolute angle sensor equipped bearing assembly of this embodiment, the provision has been made of the sensor equipped bearing 1 including the rotation detector 6 capable of providing the two analog outputs X and Y that are offset 90° in phase difference, and the data recording unit equipped component 20, which is recorded with the correction data necessary to perform the error correction when the absolute angle of the rotational angle is to be calculated based on the two analog outputs X and Y and which is used paired with the sensor equipped bearing 1. Accordingly, it is possible to achieve a high precision detection of the absolute angle without any additional correction work needed after incorporation of the bearing into the user's system, and the system design on the side of the user can be facilitated.

Since the rotation detector 6 referred to above includes the to-be-detected element 7 fitted to the rotating raceway ring 2 and having the magnetic characteristic that varies cyclically in the circumferential direction, and the two magnetic sensors 8A and 8B fitted to the stationary raceway ring 3 in face-to-face relation with the to-be-detected element 7 and capable of providing the analog outputs that are offset 90° in phase difference in terms of the electrical degree, the absolute angle can be easily outputted. Also, since the analog outputs X and Y offset 90° in phase difference can be obtained from the two magnetic sensors 8A and 8B, the quadrant determination is possible and detection of the highly precise absolute angle is also possible.

Since the correction data storing device 20 includes the correction table 26, recorded with the above mentioned correction data, and the absolute angle calculating section 27, which utilizes the correction data in the correction table 26 for calculating the absolute angle from the respective analog outputs X and Y, and since the correction data referred to above is based on the angle correction data measured after the manufacture of the sensor equipped bearing 1, calculation of the absolute angle from the output of the rotation detector 6 and correction of the calculated value thereof can be performed automatically, making it possible to detect the absolute angle with high precision.

Figure 8:
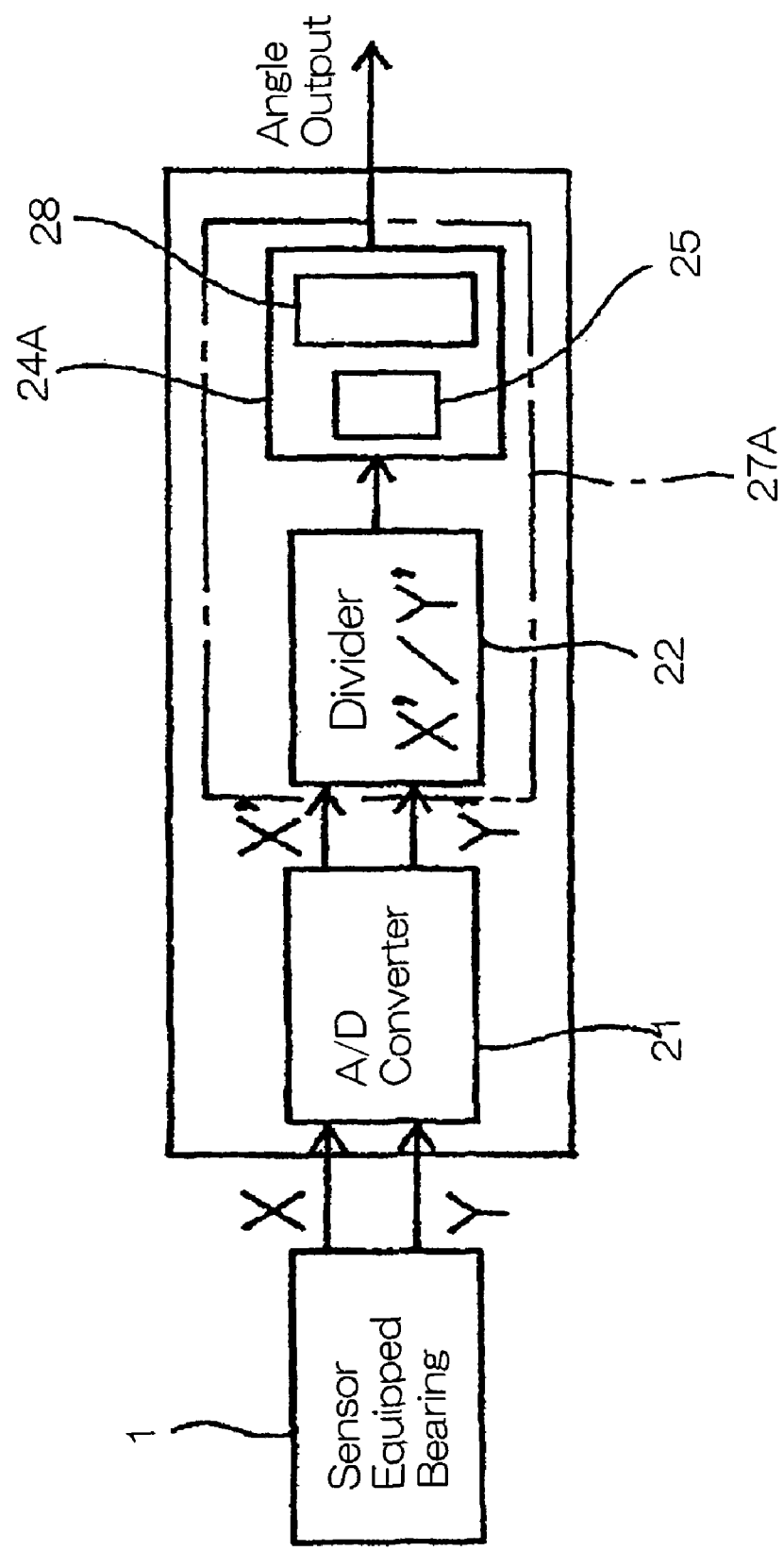
FIG. 8 is a block diagram showing a schematic structure of the absolute angle sensor equipped bearing assembly according to another preferred embodiment of the present invention.
Figure 9:
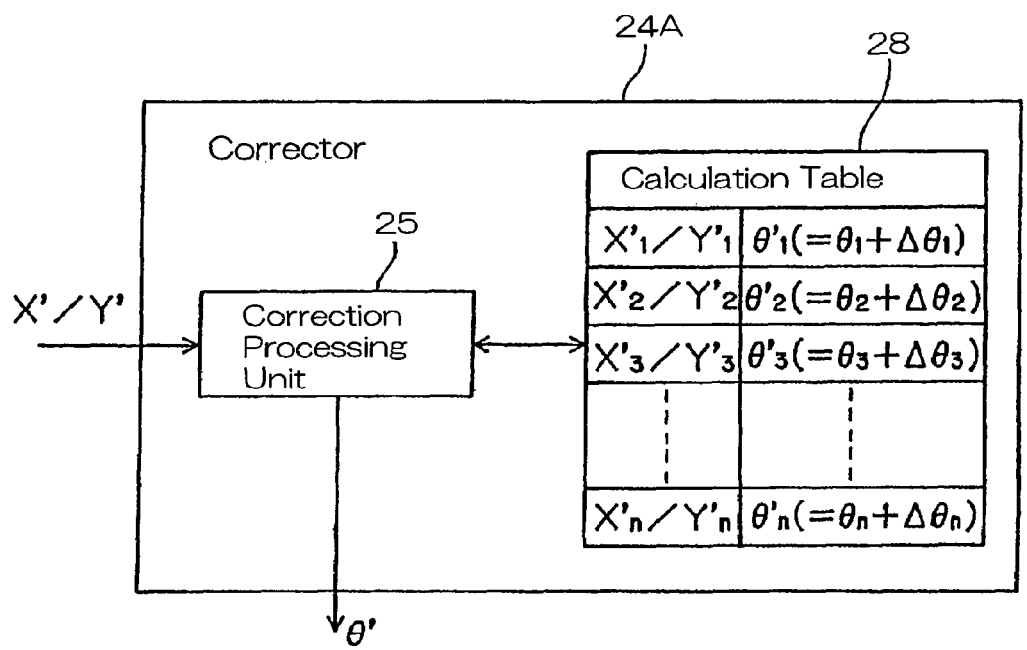
FIG. 9 is a block diagram showing the structure of the corrector employed in the bearing assembly.

FIGS. 8 and 9 illustrate a second preferred embodiment of the present invention. The absolute angle sensor equipped bearing assembly shown therein is similar to that according to the first embodiment, but differs therefrom in that the correction data storing device 20 includes an A/D converter 21, a divider 22 and a corrector 24A, with the independent inverse arc tangent calculator 23 being dispensed with. This corrector 24A serves concurrently as an inverse arc calculating means and results of the inverse arc tangent calculation represent a corrected result. More specifically, the correcting means 24A is made up of a correction processing unit 25 and a calculation table 28, that stores the calculated output (X'/Y') of the divider 22 and the result of the inverse arc tangent calculation (absolute angle), based on the calculator output, in coordination with each other. The result of the inverse arc tangent calculation stored therein is the corrected value. In other word, the correction data in the correction table 26 employed in the first embodiment is consolidated into an angle value θ'(=θ+Δθ), which represents the result of the inverse arc tangent calculation (absolute angle) in the calculation table 28 for the inverse arc tangent. The correction processing unit 25 of the correcting means 24A searches the calculation table 28 for the result θ' of the inverse arc tangent calculation, corresponding to the calculated output (X'/Y') of the divider 22, and outputs the angle value θ', which has been corrected, as the absolute angle. In such case, the divider 22 and the correcting means 24A altogether form an absolute angle calculating section 27A capable of calculating the absolute angle.

As described above, since the correction data is consolidated into the angle value θ'(=θ+Δθ), which represents the result of the inverse arc tangent calculation (absolute angle) in the calculation table 28 for the inverse arc tangent, unlike the first embodiment, in which correction calculation is made after the inverse arc tangent calculation, the result of the inverse arc tangent calculation represents the corrected result and, therefore, there is no need to perform an additional correction calculation and the calculation can be performed with a simple processing. For this reason, the processing can be carried out at high speed.

In other words, although the inverse arc tangent calculation in the digital system may be complicated, it can be easily determined by referring to the table of results of inverse arc tangent calculation that has been prepared based on the result of division. In such case, by preparing the inverse arc tangent table 28 to obtain an accurate result of the inverse arc calculation, in the event of the presence of a magnetizing error, in consideration of the correction data, a highly precise angle detecting device can be realized with no need to add any special correcting means to the absolute angle detecting circuit.

FIGS. 10 to 13 illustrates various specific examples of use of the correction data storing device 20 employed in any one of the previously described embodiments. In the example shown in FIG. 10, in the first embodiment described hereinbefore, the correction data storing device 20 is added with an interface 29 with a host side so that the detected absolute angle data can be outputted in various formats such as serial and parallel, and this correction data storing device 20 is rendered to be in the form of a one-chip microcomputer, a programmable logic circuit or a circuit board mounted with the one-chip microcomputer or the programmable logic circuit. An angle calculator 38 shown therein corresponds to a calculating means, in which the divider 22 and the inverse arc tangent calculator 23, both shown FIG. 5, are included. Thus, mounting of the correction data storing device 20 onto a circuit board of the user's system, in which the absolute angle sensor equipped bearing assembly is incorporated, can be facilitated.

Figure 10:
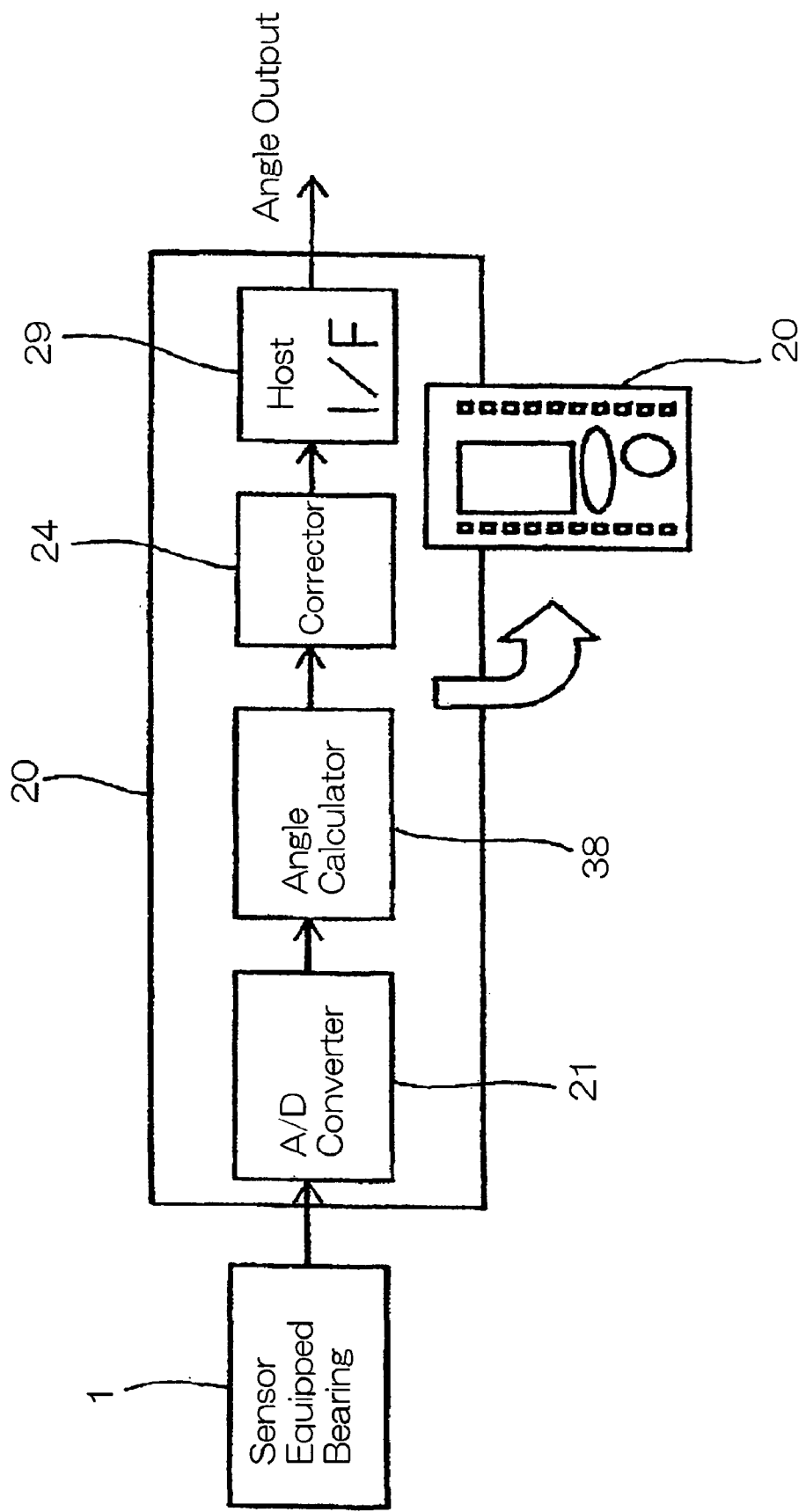
FIG. 10 is a block diagram showing a schematic structure of the absolute angle sensor equipped bearing assembly according to a further preferred embodiment of the present invention.
Figure 11:
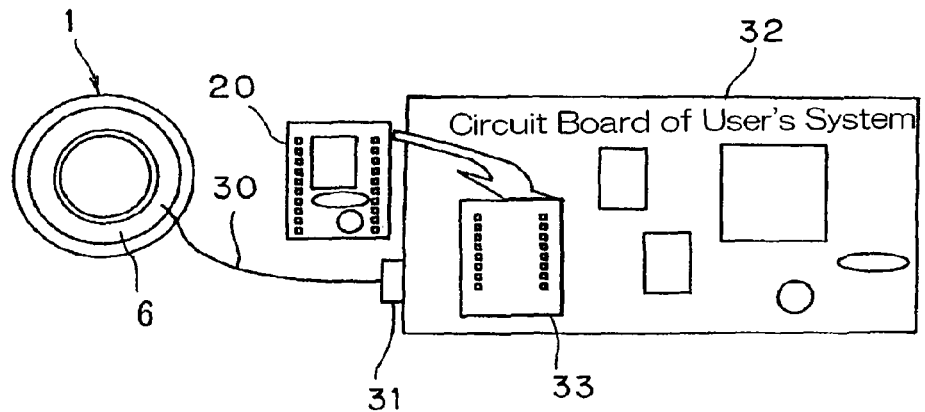
FIG. 11 is an explanatory diagram showing the manner of mounting the correction data storing device in the bearing assembly according to this embodiment.

FIG. 11 illustrates an example of the manner of fitting the correction data storing device 20 formed in a circuit board in the embodiment shown in FIG. 10. In this example, the rotation detector 6 of the sensor equipped bearing 1 is connected with a circuit board 32 of the user's system through a cable 30 and a connector 31, with the correction data storing device 20 fitted to a socket 33 on the circuit board 32 of this user's system.

Figure 12:
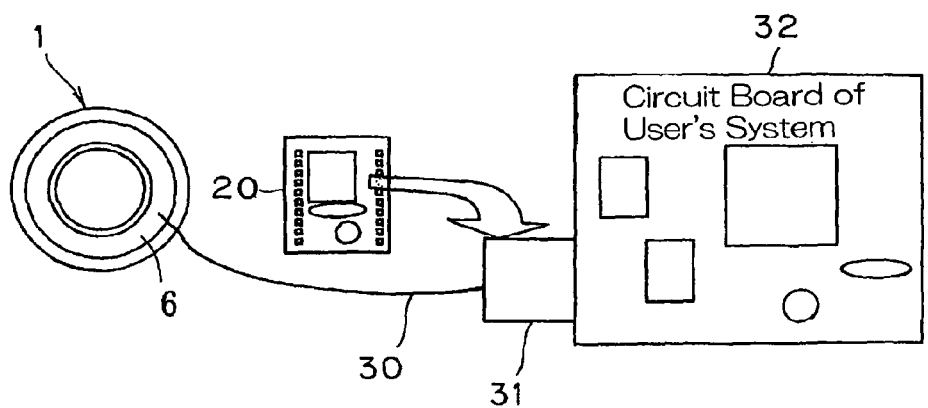
FIG. 12 is an explanatory diagram showing another manner of mounting the correction data storing device in the bearing assembly according to this embodiment.

FIG. 12 illustrates a different example of the manner of fitting the correction data storing device 20, which has been formed in the circuit board in the embodiment shown in FIG. 10. In this example, the correction data storing device 20 is fitted to the connector 31 used to connect the rotation detector 6 in the sensor equipped bearing 1 with the circuit board 32 of the user's system through the cable 30.

Figure 13:
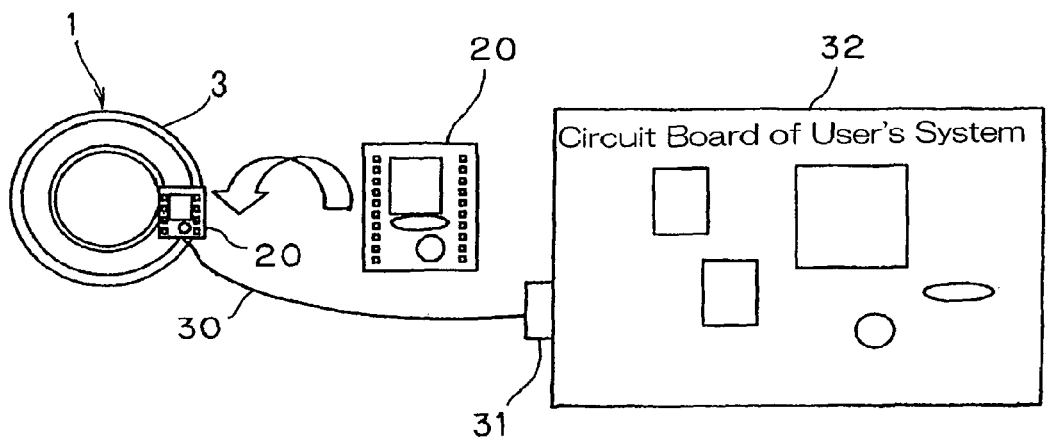
FIG. 13 is an explanatory diagram showing a further manner of mounting the correction data storing device in the bearing assembly according to this embodiment.

FIG. 13 illustrates a further example of the manner of fitting the correction data storing device 20, which has been formed in the circuit board in the embodiment shown in FIG. 10. In this example, the correction data storing device 20 is incorporated in, for example, the stationary raceway ring 3 of the sensor equipped bearing 1, so that an output (absolute angle) from the data recording unit equipped component 20 can be inputted to the circuit board 32 of the user's system through the cable 30 and the connector 31.

It is to be noted that although in any one of the foregoing embodiments, the rotation detector 6 has been shown and described as a radial type, the rotation detector 6 may be an axial type. The bearing unit 1A may also be of an axial type.

What is claimed is:

1. An absolute angle sensor equipped bearing assembly comprising:

a sensor equipped bearing
including a bearing unit having a stationary raceway ring and a rotating raceway ring rotatable relative to the stationary ring through rolling elements, and a rotation detector capable of providing, as a detection output indicative of a rotation angle of a rotating raceway ring relative to the stationary raceway ring, two analog outputs that are offset 90° in phase relative to each other in terms of electrical degree; and a correction data storing device, which stores a correction data to correct an error when an absolute angle of the rotation angle of the rotating raceway ring is calculated based on the two analog outputs, and which is used paired with the sensor equipped bearing, wherein the rotation detector includes a to-be-detected element made up of an annular backing metal and a magnetic generating member, mounted on the backing metal, in the form of an annular component having an outer peripheral portion magnetized in which one complete rotation thereof corresponds to one cycle of a sinusoidal magnetization distribution, and a magnetic sensor accommodated in an annular casing and confronting the to-be-detected element, the rotation detector being secured to the bearing unit in a manner such that a relative positional relation between the bearing unit and the rotation detector does not change after the sensor equipped bearing assembly has been incorporated in an equipment, and wherein the to-be-detected element of the rotation detector is fitted on an outer peripheral surface of the rotating raceway ring of the bearing unit through the backing metal, and the magnetic sensor is fitted on an inner peripheral surface of the stationary raceway ring of the bearing unit through the annular casing, one of the opposite end portions of the annular backing metal and one of the opposite end portions of the annular casing, both remote from the bearing unit, being bent radially inwardly to same radial positions.

2. The absolute angle sensor equipped bearing assembly as claimed in claim 1, wherein the to-be-detected element is fitted to the rotating raceway ring and has a magnetic characteristic cyclically varying in a circumferential direction, and the stationary raceway ring includes two magnetic sensors fitted in face-to-face relation with the to-be-detected element and capable of providing respective analog outputs offset 90° in phase relative to each other in terms of electrical degree.

3. The absolute angle sensor equipped bearing assembly as claimed in claim 1, wherein the correction data storing device includes a correction table, storing the correction data, and an absolute angle calculating section, which utilizes the correction table to calculate the absolute angle based on the two analog outputs, and wherein the correction data referred to above is based on an angle correction data measured after the manufacture of the sensor equipped bearing.

4. The absolute angle sensor equipped bearing assembly as claimed in claim 1, wherein the correction data is integrated with an angle value, which provides a result of calculation of an inverse arc tangent in an inverse arc tangent calculation table.

5. The absolute angle sensor equipped bearing assembly as claimed in claim 1, wherein the correction data storing device is a one-chip type microcomputer, a programmable logic circuit or a circuit board having the one-chip microcomputer or the programmable logic circuit mounted thereon.

* * * * *